J. D. ALLEN.
COMPENSATING GEARING FOR MOTOR VEHICLES.
APPLICATION FILED JAN. 13, 1919.

1,390,420.

Patented Sept. 13, 1921.

Witness
JN. Kyler

Inventor
John D. Allen
By Howard A. Coombs
his Attorney

UNITED STATES PATENT OFFICE.

JOHN D. ALLEN, OF PHILADELPHIA, PENNSYLVANIA.

COMPENSATING GEARING FOR MOTOR-VEHICLES.

1,390,420.  Specification of Letters Patent.  Patented Sept. 13, 1921.

Application filed January 13, 1919. Serial No. 270,836.

*To all whom it may concern:*

Be it known that I, JOHN D. ALLEN, a citizen of the United States, residing at Philadelphia, in the county of Philadelphia and State of Pennsylvania, have invented new and useful Improvements in Compensating Gearing for Motor-Vehicles, of which the following is a specification.

This invention relates to compensating gearing, especially designed to be used in place of the usual gear differential of motor vehicles; it overcomes the defects of the latter in a similar way to the mechanism of my Patents Nos. 1,238,730; 1,264,744, 1,265,- 160, and 1,323,384, and those of my pending application Ser. No. 186,937, filed August 18, 1917, continued as Ser. No. 274,009, filed January 30, 1919.

The present invention is more particularly a modification of, or improvement upon, the mechanism of the last mentioned applications, Ser. Nos. 186,937, and 274,009, and differs therefrom principally in that externally toothed ratchet wheels are used instead of internally toothed, and that the pawls, instead of being disengaged from the teeth of the ratchet wheels by means of rocking dogs or cams, actuated by the relative angular movement of the driving shell or casing and the intermediate driving member, spider or pawl carrier, are mounted in and carried by oscillatory pawl containers, journaled in said spider and having a part engaging the shell or casing, whereby they are oscillated, to engage the pawls facing one way and simultaneously disengage those facing the other way, whenever the shell turns relatively to the spider. This construction presents certain advantages over that of the said applications, both in respect to simplicity of manufacture, compactness and certainty in operation.

It is thought unnecessary to repeat here the advantages of these types of compensating gearing over the usual gear differential, as they are fully set forth in my said patents and applications, as well as in numerous other patents of the prior art. The principal idea is the positive drive of both wheels, independently of each other, in either direction, while permitting either wheel to overrun the other in rounding a curve. There is no reactive effect of the faster turning wheel upon the other, as in the said gear differential, and, consequently, no tendency to side skidding or back spinning of either wheel. It is believed to be entirely novel to mount the pawls in containers which are oscillated by the relative movement of the primary and secondary driving members.

This latest form of my compensating gearing for motor vehicles is illustrated in the accompanying three sheets of drawing, in which.

Figure 1:
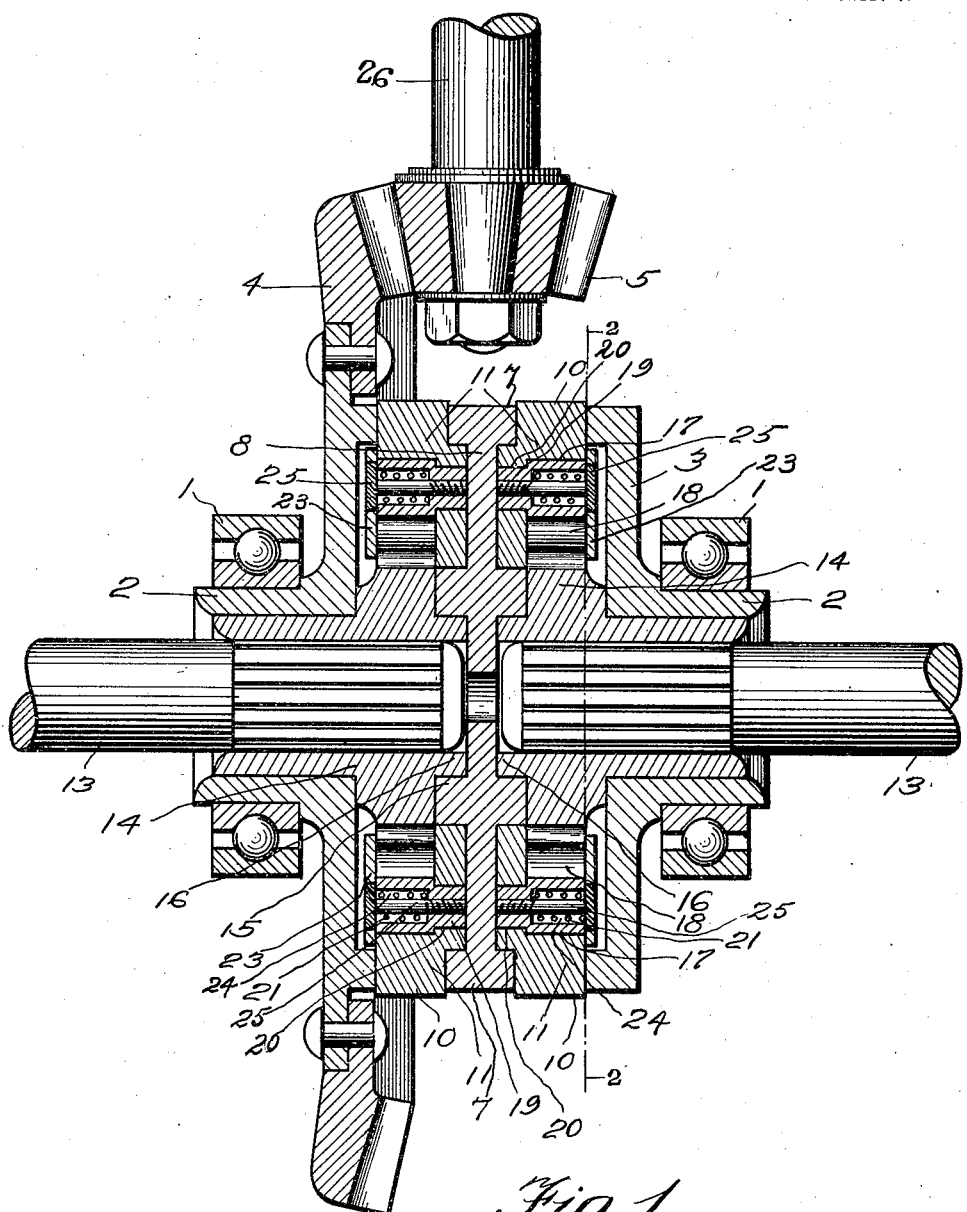
Figure 1 is a longitudinal central section of the mechanism, taken on the line 1—1 of Fig. 2.
Figure 2:
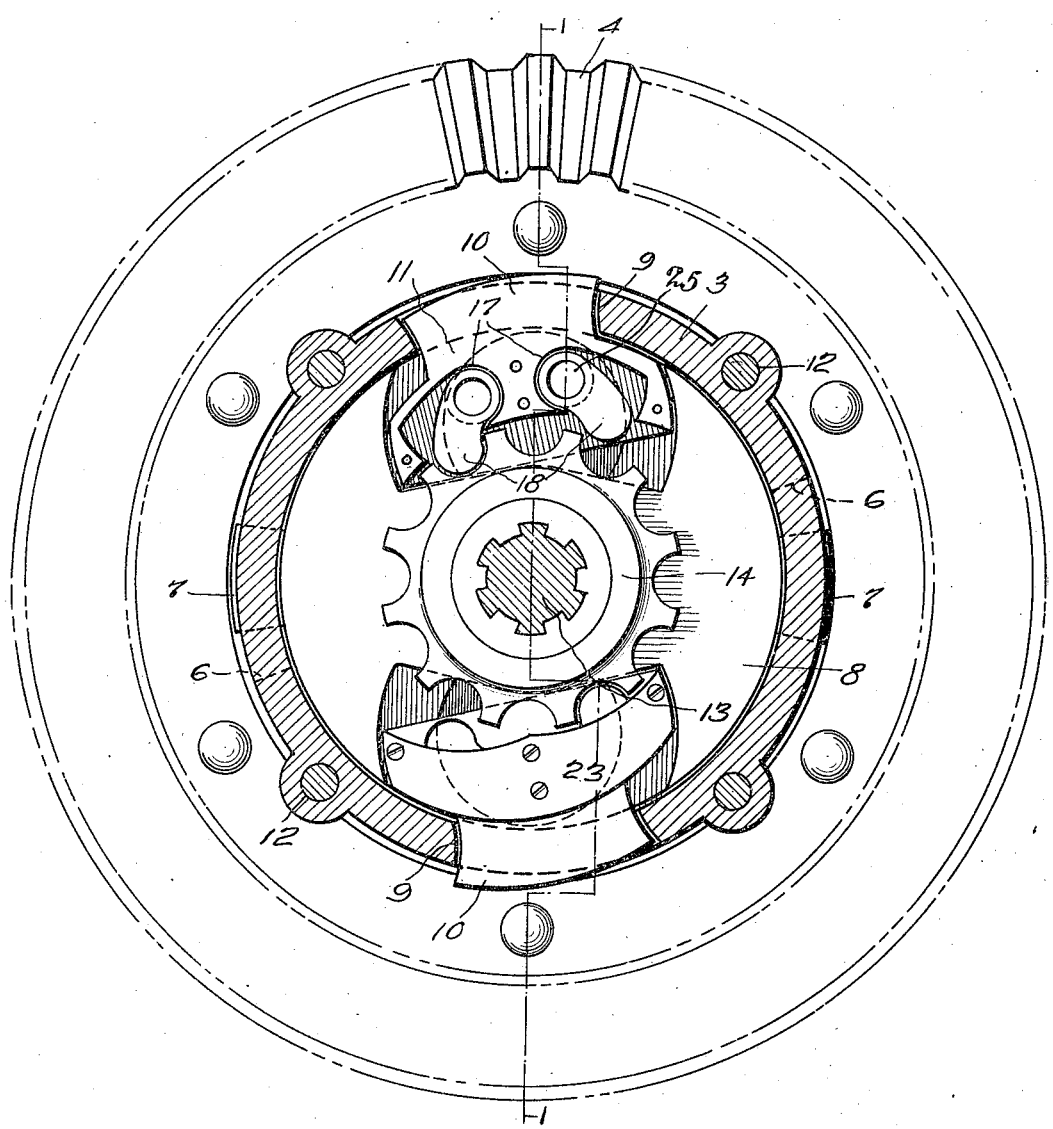
Fig. 2 is a cross section of the same, taken on the line 2—2 of Fig. 1.
Figure 3:
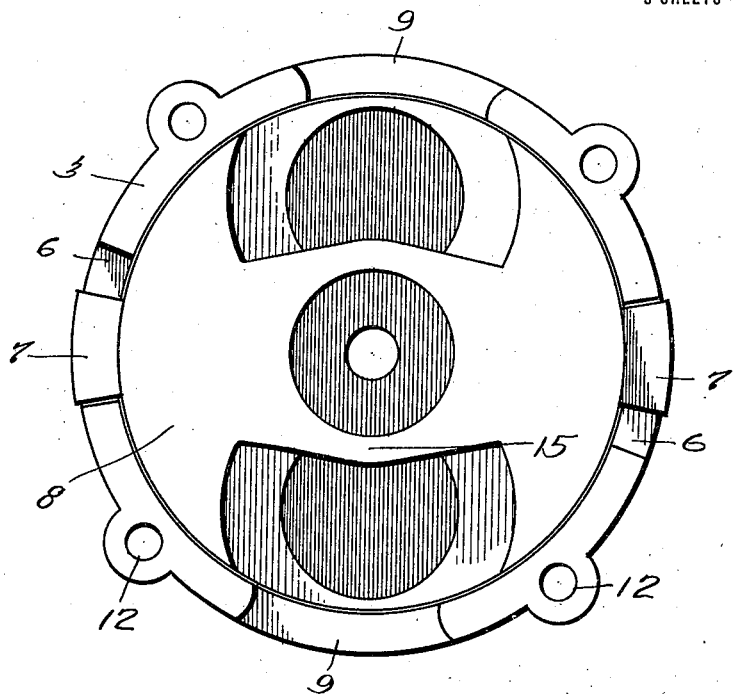
Figs. 3, 4 and 5 are detail views of some of the parts.
Figure 4:
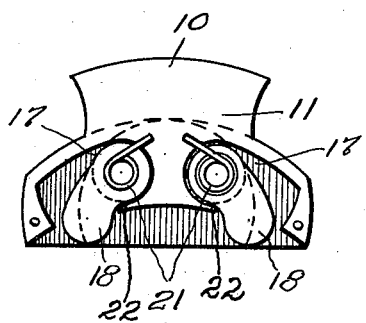
Figure 5:
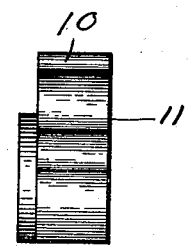

The bearings, carried by the vehicle axle or gear housing, not shown, are represented at 1, 1; in them are journaled the hubs 2, 2, of the primary driving member, which is in the form of a shell or casing 3, to which the ring gear 4 is secured. 5 represents the driving pinion for said gear, and 26 the shaft of said pinion, transmitting the power from the motor, not shown. Casing 3 is provided with slots 6, 6, in its periphery for the reception of lugs 7, 7, formed on the secondary driving member, which is in the form of a spider 8, and with other slots 9, 9, for the reception of the lugs 10, 10, of the pawl containers 11, 11, to be hereinafter more fully described. Casing 3 is made in two parts held together by bolts passing through the holes 12. The lugs 7 are shorter than the slots 6, which permits a limited relative angular movement between the shell and the spider.

13, 13, represent the two halves of the floating axle or shaft through which the power is transmitted to the wheels, not shown. The inner ends of said divided shaft are splined into the hubs 16, 16 of the driven members 14, 14, rotatably mounted in the hubs 2, 2, of the shell or casing 3 on one side, and of the hubs 15 of the spider 8 on the other side. Spider 8 is recessed on its opposite faces for the reception of the hubs of the pawl containers 11, of which there are two on each side at diametrically opposite points. The pawl containers are oscillated on their hubs by the engagement of their arms or lugs 10 with the slots 9 in the casing, the faces of said lugs and the ends of said slots being suitably curved, as shown, to permit of such oscillation whenever there is a relative angular movement between the casing and the spider.

Each of the pawl containers is recessed at 17, 17, for the reception of a pair of oppositely facing pawls 18, 18, which are journaled by their hubs 19, 19, in holes 20 of said containers. A coil spring 21 is mounted in a counterbore 24 in each pawl, one end of the spring being secured to the container and the other end to the pawl, a headed pin or bolt 25 serving to maintain the spring in place. The shoulders 22 at one side of the recesses in the containers limit the outward movement of the pawls and springs, and the plates 23 hold the pawls in place in said recesses.

Each of the driven members 14 comprises a gear or set of ratchet teeth, formed by cutting semi-cylindrical grooves across its face, so as to adapt said teeth to co-act with the oppositely facing pawls.

When the containers are oscillated, by the angular movement of the shell relatively to the spider, they place the pawls facing one way in engagement with the teeth of the driven members and remove the pawls facing the other way out of engagement with said teeth. The springs permit the pawls to yield when the driven members turn faster than the driving members.

The operation of the mechanism will now be apparent; the same result is obtained as by the mechanism of my said application, Ser. No. 274,009, but in a simpler and more positive way. The rocking of the containers places the pawls into and out of engagement with the teeth of the driven members, and the springs permit the latter to overrun the pawls when required. In this form of the mechanism, there is no possible danger of the parts sticking and failing to provide for the positive drive of both wheels, or of the inner wheel on a curve. Reversal of the power, or acceleration of the driven members, inevitably causes rocking of the containers and consequently, reversal of the pawl engagement. It is to be noted that there is no possibility of any of the parts becoming distorted or displaced under the strain. The primary driving member, the casing 3, is journaled by its hubs 2 in the differential housing, or fixed axle frame member. The secondary driving member, the spider 8, is journaled in the casing 3, and the driven members 14 are journaled in the hubs of the casing 3, on the one side, and in the hub of the spider 8, on the other side. The whole mechanism takes up no more space than the usual gear differential, and can be substituted therefor in existing vehicles.

Having thus described my invention, what I claim is:—

1. In a gearless differential, the combination with the alined driven members provided with ratchet teeth, the inclosing driving casing, and the intermediate member having a lost-motion connection with the casing, of pawl-carriers pivoted on said intermediate member and having lugs engaging slots in said casing, and a pair of oppositely-facing pawls pivotally seated in each pawl-carrier.

2. In a gearless differential, the combination with alined driven members having external ratchet teeth, a driving casing in which said driven members are journaled, and an intermediate member within said casing and between said driven members, of lugs on said intermediate member engaging with some play in slots in said casing, a pawl-carrier pivotally mounted on each side of said intermediate member, lugs on said carriers snugly fitting slots in said casing, and a pair of oppositely-facing, spring-pressed pawls pivotally mounted in each carrier in position to alternately engage said ratchet teeth.

3. A gearless differential comprising a hollow slotted driving casing, a pair of ratchet wheels journaled therein, a member intermediate said wheels and having a lost-motion driving connection with said casing, a pair of pawl-carriers pivotally carried on each side of said member, each carrier having a lug fitting a slot in said casing, and a pair of oppositely-facing pawls pivotally seated in each of said carriers.

In testimony whereof I have hereunto set my hand.

JOHN D. ALLEN.